United States Patent
Yamamoto et al.

(10) Patent No.: US 6,619,636 B2
(45) Date of Patent: Sep. 16, 2003

(54) LIQUID-SEALED ANTI-VIBRATION DEVICE

(75) Inventors: Hikofumi Yamamoto, Osaka (JP); Yukio Takashima, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 10/074,661

(22) Filed: Feb. 12, 2002

(65) Prior Publication Data
US 2002/0140143 A1 Oct. 3, 2002

(30) Foreign Application Priority Data
Mar. 30, 2001 (WO) ................ PCT/JP01/02718

(51) Int. Cl.$^7$ ............................. F16F 13/00
(52) U.S. Cl. ................ 267/140.13; 267/141.1
(58) Field of Search .............. 267/140.13, 140.14, 267/141.1, 140.11, 140.4, 141, 141.4, 141.5, 219, 292

(56) References Cited

U.S. PATENT DOCUMENTS

| | | |
|---|---|---|
| 4,711,206 A | 12/1987 | Andrae |
| 4,742,999 A | 5/1988 | Flower |
| 4,986,510 A | 1/1991 | Bellamy et al. |
| 5,571,264 A * | 11/1996 | Maruyama et al. ..... 267/140.14 |
| 5,911,412 A * | 6/1999 | Durand et al. ......... 267/140.13 |
| 6,394,432 B1 * | 5/2002 | Whiteford .............. 267/140.13 |
| 6,425,575 B1 * | 7/2002 | Takashima et al. ..... 267/140.13 |
| 6,505,822 B1 * | 1/2003 | Yamamoto et al. ..... 267/140.13 |

FOREIGN PATENT DOCUMENTS

| | | |
|---|---|---|
| FR | 2674590 | 10/1992 |
| JP | 2000-230600 | 8/2000 |
| JP | 2001-20992 | 1/2001 |

* cited by examiner

Primary Examiner—Christopher P. Schwartz
Assistant Examiner—Melanie Torres
(74) Attorney, Agent, or Firm—Jordan and Hamburg LLP

(57) ABSTRACT

A liquid-sealed anti-vibration device wherein an annular space is formed between an orifice member and a partition plate member, crimped and fixed downwardly of the orifice member to an anti-vibration device proper, of a partition; and a rubber-like elastic membrane is disposed in the space and has a base portion attached fixedly to the one of the orifice member and the partition plate member and an open terminal at a distal side, the open terminal being slidably in pressure contact with the other, thus constituting a cantilevered sliding membrane structure. Thereby it is possible to diminish the amplitude dependency, to reduce the dynamic spring constant in a wide spectrum of medium and high frequencies, and to lower the noise.

1 Claim, 4 Drawing Sheets

(a)

(b)

LIQUID-SEALED ANTI-VIBRATION DEVICE

BACKGROUND OF THE INVENTION

1. Field of the Invention

This invention relates to a liquid-filled anti-vibration device mainly used for supporting a vibration generator, e.g. an automotive engine.

2. Description of Related Art

As an engine mount or a liquid-sealed vibration-proof device for supporting and bearing an automotive engine or any other vibration generator so as not to transmit the vibrations to the vehicle body side, there is known the one that is provided with a partition bisecting the liquid chamber inside the vibration-proof device proper into a main liquid chamber and a subsidiary liquid chamber and being formed by an orifice, through which the main liquid chamber and the subsidiary liquid chamber communicate with each other so that a vibration damping function may be exhibited owing to the fluidization effect of the liquid via the orifice through both liquid chambers. Another ones are also known, wherein an elastic membrane or a movable plate is formed to the aforementioned partition.

The elastic membrane type and the movable plate type are equal in respect of the functionality (reduction effect of dynamic spring constant). With the elastic membrane type, however, since the rubber-like elastic membrane in a hemispherical form is vulcanization-bonded to the partition so as to block the opening of the partition, the rubber-like elastic membrane has limits in amplitude and in the event that an excessive external force is exerted on the rubber-like elastic membrane, a large hydraulic pressure is generated with the result that the elastic membrane is broken down or separated. Thus this was limited in reduction of the amplitude dependency.

On the other hand, the movable plate type is constructed so that stoppers limiting the movable area of the movable plate are provided at upper and lower parts of the partition and the movable plate is reciprocated within this movable area. Consequently, the movable plate impinges on the stoppers to generate an abnormal sound (hitting sound), and is subject to restriction in obviating the hitting sound.

SUMMARY OF THE INVENTION

In order to solve the above-mentioned problems, this invention is aimed at providing such a liquid-sealed anti-vibration device that despite adopting a shape difficult to generate the abnormal sound, the amplitude dependency can be reduced and the dynamic spring constant in a wide spectrum of median to high frequencies can be reduced.

The solution means for them resides in that a partition is provided to divide a liquid chamber formed between a vibration-isolating base and a diaphragm constituting an anti-vibration device proper into main liquid chamber and a subsidiary liquid chamber, and that the partition includes an orifice member having an orifice channel at a peripheral lateral part, a partition plate member crimped and fixed beneath the orifice member to the anti-vibration device proper thereby forcing an outer peripheral portion of an upper end of the orifice member to an outer peripheral end of the vibration-isolating base on the liquid chamber side, and a rubber-like elastic membrane disposed in a space formed between the orifice member and the partition plate member, the rubber-like elastic membrane having a base portion attached fixedly to the one of the orifice member and the partition plate member and an open terminal at its distal end, the open terminal being slidably brought into pressure contact with the other, thereby constituting a cantilevered sliding membrane structure.

According to the construction above, the rubber-like elastic membrane provided for the partition is, because of the cantilevered sliding membrane structure, free from interfering with the stopper under the normal oscillations, as is the case with the movable plate type, permitting the generation of the abnormal sound or hitting sound to be minimized. Furthermore, the open terminal of the rubber-like elastic membrane slides toward the other member differently from the prior art elastic membrane type that the opening of the partition is obstructed and hence, the amplitude dependency is minimized and the functions meeting required characteristics can be exhibited.

As a specific structure of the partition, such a constitution can be exemplified that the orifice member is configured in an annular form while the partition plate member is comprised of a cylindrical portion disposed inwards, a flange-like forcing portion extending from a lower end of the cylindrical portion radially outwardly to force the underside of the orifice member, and a crimped lock portion linking from the forcing portion at its radially outward side; and an annular space is formed between the cylindrical portion of the partition plate member and the annular inner peripheral wall of the orifice member and within this space the rubber-like elastic membrane is disposed.

In this case, it is possible to adopt either an embodiment wherein the base portion (an inner peripheral side) of the rubber-like elastic membrane is attached fixedly to the cylinder portion of the partition plate member and the open terminal (an outer peripheral end) at a distal end is in pressure contact with the annular inner peripheral wall of the orifice member so as to be freely slidable or another embodiment wherein the base portion (an outer peripheral side) of the rubber-like elastic membrane is attached fixedly to the annular inner peripheral wall of the orifice member and the open terminal (an inner peripheral end) is in slidably pressure contact with the side part of the cylindrical portion of the partition plate member.

As a fixedly attaching means for the base portion of the rubber-like elastic membrane, it is possible to adopt any embodiments, for example an embodiment of vulcanization bonding to the orifice member or the partition plate member, an embodiment of press-fitting in either of them, an embodiment of pinching and pressing between an inward projecting portion of the annular orifice member and the cylindrical portion of the partition plate member, or the like.

To restrain the sliding range of the rubber-like elastic membrane, it is desirable further to form a restraint portion for preventing the deformation of the rubber-like elastic membrane due to a large displacement at axially (orthogonal direction to the parting plane of the partition in the liquid chamber) both sides thereof. It will suffice that the restraint portion avails itself of both a protuberant portion projecting inwardly of a part of the annular inner peripheral wall and a part of the partition plate member. Also in this case, the rubber-like elastic membrane is of a cantilevered sliding membrane structure and consequently, it is possible to decrease sufficiently the generation of an abnormal sound as compared with the prior art movable plate type where the plate hits intermittently against the upper and lower stopper walls.

From the aspect of exhibiting a desired vibration damping function it is preferred that the open terminal of the rubber-like elastic membrane be made thick-walled because a contact area with the orifice member or the sliding wall of the partition plate member can be ensured and the leakage of liquid between the main liquid chamber and the subsidiary liquid chamber is obviated.

Further where the rubber-like elastic membrane is formed on its inner face with reinforcing ribs circumferentially at plural positions, it is possible to suppress any dimensional change of the rubber-like elastic membrane due to a hydraulic pressure difference between the main and the subsidiary liquid chambers, and this is suitable in maintaining the desired vibration-damping function.

DESCRIPTION OF PREFERRED EMBODIMENTS

Figure 1:
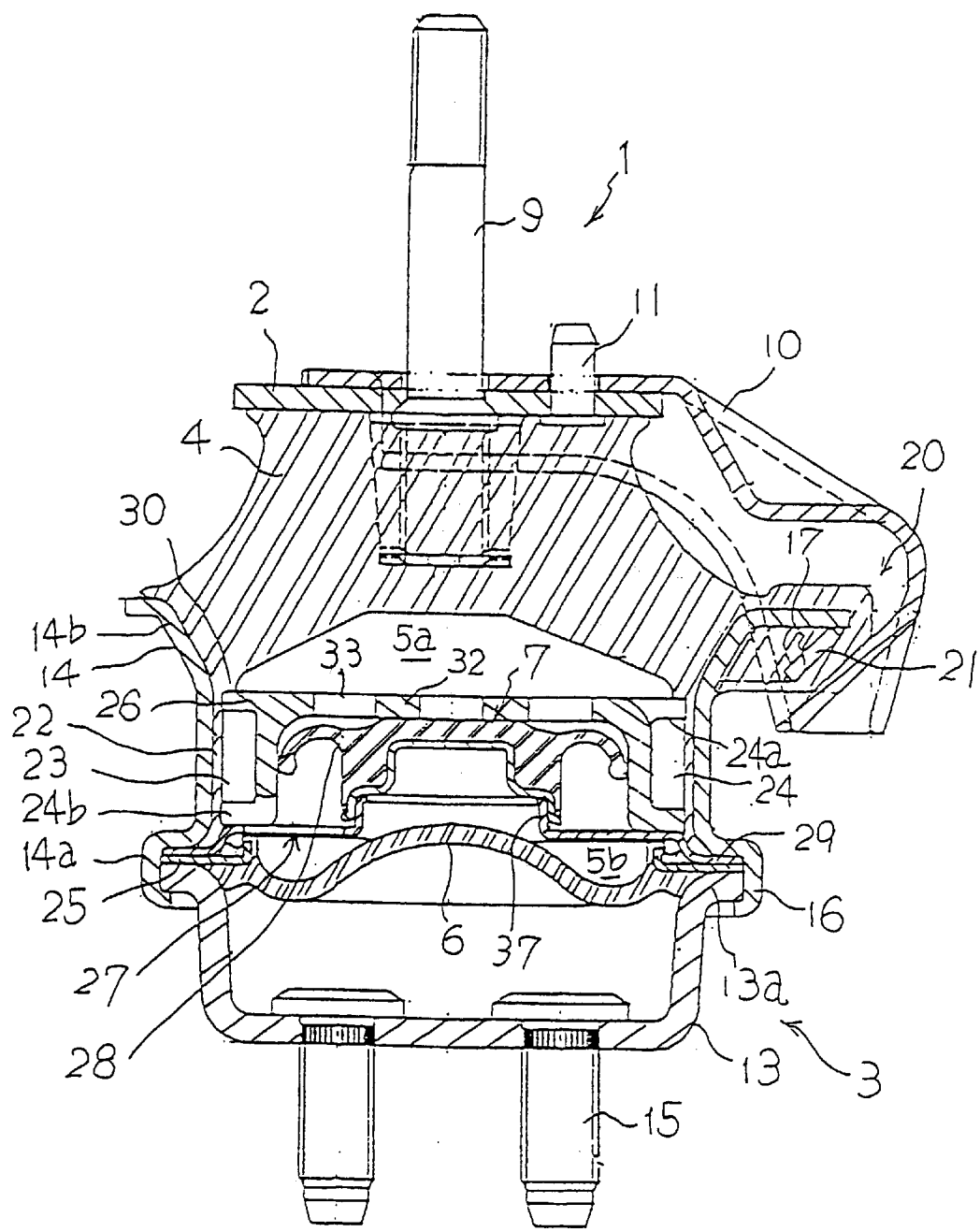
FIG. 1 is a sectional view of a liquid-sealed anti-vibration device showing one embodiment of this invention.

Best modes for carrying this invention into effect will be hereinafter described with reference to the accompanying drawings. In a liquid-sealed anti-vibration device 1 of this embodiment, its anti-vibration device proper is made up of an upper attachment fitting 2 adapted to be fitted to the side of a vibration generator, e.g. an engine, a lower attachment fitting 3 adapted to be fitted to a vehicle body side, a vibration-isolating base 4 interconnecting both attachment fittings 2, 3, and a diaphragm 6 disposed on the lower attachment fitting 3 side in an opposing manner to the vibration-isolating base 4 and constituting a liquid chamber 5 between the attachment fitting 3 and the vibration-isolating base 4.

Within this device proper, there is provided a partition 7 partitioning the liquid chamber 5 into an upper main liquid chamber 5a and a lower subsidiary liquid chamber 5b. The partition 7, which will be later described, is provided with an orifice channel 23 and a rubber-like elastic membrane 28 so as to exhibit vibration-damping functions in different amplitude ranges.

The upper attachment fitting 2 is formed in a flat plate and has an attachment bolt 9 projecting upwardly to support an engine, etc. fixed at its center. At the upper face of the upper attachment fitting 2, a stopper fitting 10 of a generally C-shape in cross-section overhanging laterally beyond it is fixed at a base terminal portion thereof by positioning by means of a screw (vis) 11.

The lower attachment fitting 3 is composed of a bottomed cylindrical portion 13 having an outer flange 13a flaring at an upper end and a cylindrical drum portion 14 whose lower end is fastened from outwardly to the outer flange 13a.

At the bottom of the bottomed cylindrical portion 13 there are fixed attachment bolts 15 to be attached fixedly to the vehicle body side. The cylindrical drum portion 14 has a lower terminal flange 14a splaying at a lower end so as to pinch and hold the diaphragm 6 and an outer peripheral lock portion 29 of a partition plate member 27 of the partition 7 between the lower terminal flange 14a and the outer flange 13a of the bottomed cylindrical portion 13. From the end of the lower terminal flange 14a, there extends a fastening portion 16, which in turn internally inserts the outer flange 13a of the bottomed cylindrical portion 13 and is crimped and fastened so as to surround it from outside.

The cylindrical drum portion 14 extends at its upper part in a manner splaying outwardly in a taper form and the splaying portion 14b is formed, at a part of its upper end, with a flange 17 opposing an end of the stopper fitting 10. The vibration-isolating base 4 is bonded by vulcanization so as to circumscribe the inner side of the splaying portion 14b and the outer periphery of the flange 17.

The vibration-isolating base 4 serves to exhibit a vibration-isolating function and is shaped in an umbrella form by vulcanization bonding to the upper attachment fitting 2 and the cylindrical drum portion 14 of the lower attachment fitting 3. The vibration-isolating base 4 encompasses the flange 17 of the cylindrical drum portion 14 and further extends up to a location opposing the inner face of the top end of the stopper fitting 10, thus forming a stopper portion 20 for absorbing a large displacement.

The stopper portion 20 has a reinforcement fitting 21 embedded and interposed between the flange 17 and the stopper fitting 10. Further, the rubber-like elastomer of the vibration-isolating base 4 extends to the lower end of the inner wall of the cylindrical drum portion 14 in a thin film form, and the partition 7 is press-fitted in the thin film portion 22 at its inner peripheral wall.

The diaphragm 6 has a flexible rubber-like elastic membrane. At an outer periphery of the diaphragm, the inward end of an annular support fitting 25 is embedded and integrated, and seated on the outer flange 13a of the bottomed cylindrical portion 13. The space enclosed by the diaphragm 6 and a lower side and the thin film portion 22 of the vibration-isolating base 4 is the liquid chamber 5a, and the partition 7 is disposed to compart the liquid chamber 5 into upper and lower parts.

Figure 2:
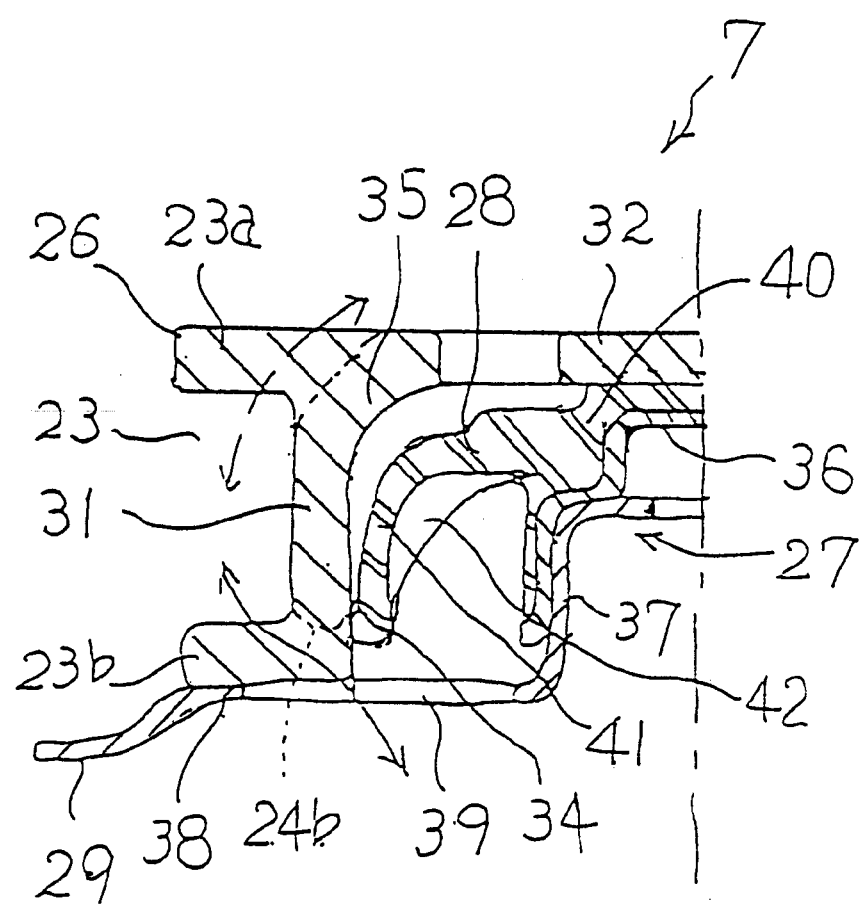
FIG. 2 is an enlarged sectional view showing essential parts of a partition in the device.
Figure 3:
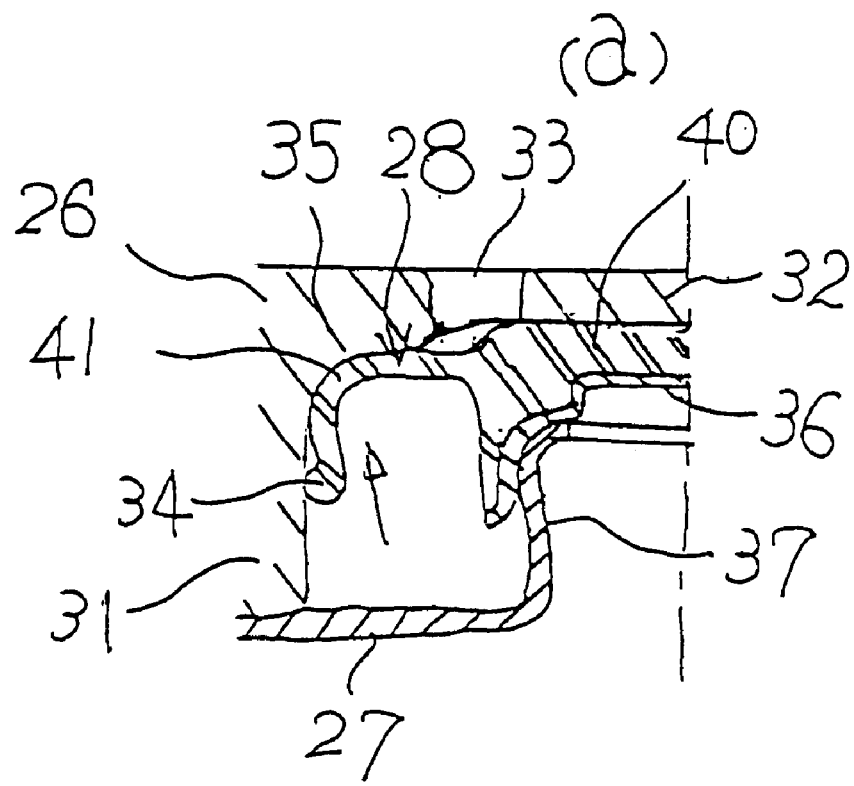
FIG. 3A and FIG. 3B are sectional views of a slidable elastic membrane of the partition showing its ascent state and its descent state, respectively.
Figure 3:
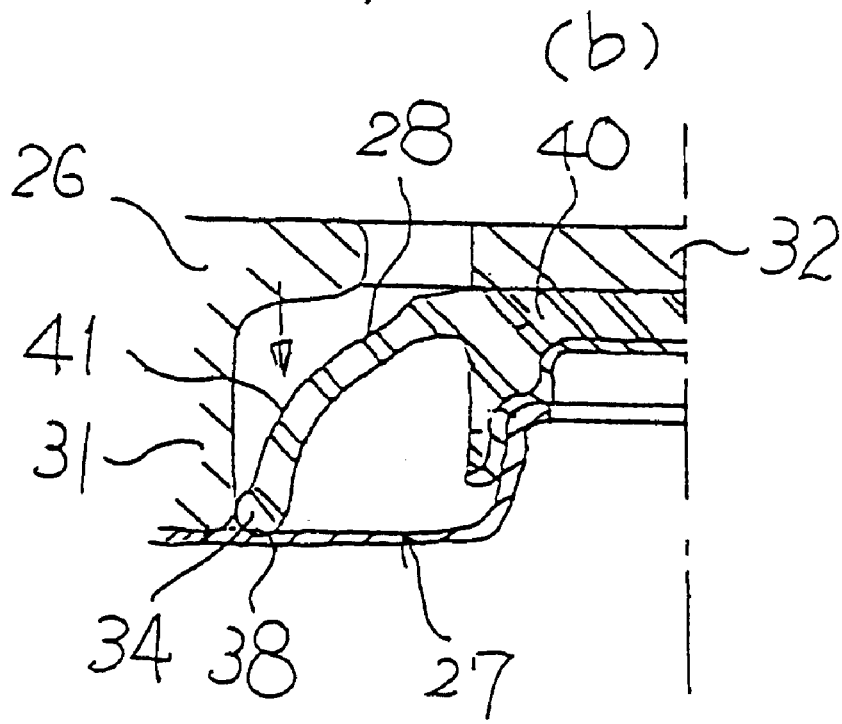

As shown in FIGS. 1 to 3, the partition 7 is composed of three members of: an orifice member 26, the partition plate member 27 and the rubber-like elastic membrane 28. Only an outer peripheral lock portion 29 of the partition plate member 27 is crimped and fixed to the bottomed cylindrical portion 13 of the lower attachment fitting 3 and the fastening portion 16 of the cylindrical drum portion 14. On the other hand, an outer peripheral portion of the upper end of the orifice member 26 is formed, at an outer peripheral end of the vibration-isolating base 4 on the liquid chamber side, as an annular part, which is seated and forced onto a cutout step portion 30 assuming an L-shape in cross-section.

The orifice member 26 is a mold shaped product in a generally inverted cup form and formed circumferentially by an orifice channel 23 of a transverse U-shape in cross-section whose peripheral lateral part is open, the orifice channel 23 and the inner peripheral wall of the thin film portion 22 of the vibration-isolating base 4 surrounding a space as an orifice 24.

The orifice channel 23 is formed by a port opening 24a on the main liquid chamber side at its upper end wall 23a and by a port opening 24b on the subsidiary liquid chamber side communicating with the subsidiary liquid chamber side at its lower end wall 23b. A partitioning longitudinal wall (not shown) for preventing the shortcut of both port openings 24a, 24b is further formed so as to obstruct the orifice channel 23.

From the top end of the annular inner peripheral wall 31 forming the orifice channel 23, a canopy (hood) portion 32 is formed so as to cover the inner opening of the annular inner peripheral wall 31. The canopy portion 32 is further formed by holes 33 bringing the main liquid chamber 5a and the subsidiary liquid chamber 5b into communication with each other so that the holes 33 are distributed in a scattering manner. The inner face of the boundary between the annular inner peripheral wall 31 and the canopy portion 32 is radiused and functions as a restraint portion 35 for suppressing the rise of an open terminal 34 of the rubber-like elastic membrane 28, which will be later described.

The material making the orifice member 26 may be either aluminum or an engineering plastic. In particular, polyphthalamide (PPA) resin or polyphenylenesulfide (PPS) resin containing 30 to 60% of glass fiber is suitable. These glass fiber-containing resins have a high strength and an excellent rigidity and dimensional stability and besides, is particularly excellent in resistance to ethylene glycol as a sealing liquid of the liquid-sealed anti-vibration device and in heat resistance to the sealing liquid at an elevated temperature upon vibration damping.

The partition plate member 27 is made from a plate material by press forming and includes a cylindrical portion 37 for receiving and supporting a reinforcing fitting 36 of the rubber-like elastic membrane 28, a forcing portion 38 bent from the lower end of the cylindrical portion 37 radially outwardly and forcing a lower wall 23b of the orifice member 26 upwardly, and an outer peripheral lock portion 29 crimped and locked to the lower attachment fitting 3, linked from inboard to outboard in this order.

The cylindrical portion 37 is located inwards of the annular inner peripheral wall 31 of the orifice member 26 thus forming an annular space between the annular inner peripheral wall 31 and the cylindrical portion, in which the rubber-like elastic membrane 28 can be interposed, and its cylindrical center is located longitudinally (axially). The upper end of the cylindrical portion 37 is bent inwardly so that the underside of the reinforcement fitting 36 of the rubber-like elastic membrane 28 may rest on it.

The forcing portion 38 and the outer peripheral lock portion 29 of the partition plate member 27 are nearly plane, the forcing portion 38 being proud of the outer peripheral lock portion 29 by one step. The forcing portion 38 is formed, at a position directly beneath the port opening 24b on the subsidiary liquid chamber side, by a communication hole 39 communicating with the subsidiary liquid chamber 5b. The forcing portion 38 functions also as a restraint portion for suppressing the descent of the open terminal 34 of the rubber-like elastic membrane 28.

The rubber-like elastic membrane 28 is made of a rubber or resin elastomer. It is provided with a thick-walled base portion 40 attached fixedly to the cylindrical portion 37 of the partition plate member 27 and a thin film-like sliding membrane portion 41 having the open terminal 34 that is slidably in pressure contact with the annular inner peripheral wall 31 of the orifice member 26, thus constituting a cantilevered sliding membrane structure.

The base portion 40 is formed as a thick-walled inverted cup shape, and to the underside of the base portion, the reinforcement fitting 36 assuming likewise an inverted cup form is bonded by vulcanization. The base portion 40 is integrated in the state that the reinforcement fitting 36 is fitted and rested on the cylindrical portion 37 of the partition plate member 27 and simultaneously is pinched and pressed between the cylindrical portion 37 and the canopy portion 32 of the orifice member 26.

The sliding membrane portion 41 is configured in an arc form in cross-section with its underside being a depression, and reinforcing ribs 42 are integrally molded by vulcanization circumferentially at plural positions on an inner face thereof, thus suppressing the dimensional change of the rubber-like elastic membrane 28 due to a hydraulic pressure difference between the main liquid chamber 5a and the subsidiary liquid chamber 5b. The open terminal 34 of the sliding membrane portion 41 assumes a thick-walled circular form in cross-section so as to ensure a contact area with an inside sliding face of the annular inner peripheral wall 31 of the orifice member 26.

In assembling the liquid-sealed anti-vibration device 1 thus constructed above, first, the orifice member 26 having the orifice channel 23 of a predetermined size formed at its margin is shaped in a mold from an aluminum material. Aside from it, the partition plate member 27 is press molded while the rubber-like elastic membrane 28 is molded by vulcanization integrally with the reinforcement fitting 36.

In the liquid, in the state that the lower opening of the cylindrical drum portion 14 of the lower attachment fitting 3, which is connected to the upper attachment fitting 2 through the vibration-isolating base 4, is upturned and the interior is evacuated of air, the orifice member 26 together with the rubber-like elastic membrane 28 are press-fitted along the thin film portion 22 of the vibration-isolating base 4 until the outer margin of the upper end of the orifice member 26 reaches the cutout step portion 30. From the upside, the partition plate member 27 is press-fitted or inserted along the fastening portion 16 of the cylindrical drum portion 14.

At that time, while the cylindrical portion 37 of the partition plate member 27 is inserted along the inner peripheral face of the reinforcement fitting 36 of the rubber-like elastic membrane 28, the press-fitting or inserting step is conducted so that the communication hole 39 of the partition plate member 27 and the port opening 24b face together. Then the annular support fitting 25 of the diaphragm 6 is press-fitted or inserted in the fastening portion 16.

These works are conducted in the liquid, and after sealing the liquid in the space between the diaphragm 6 and the vibration-isolating base 4, the resulting workpiece is removed out into the atmosphere and the residual liquid is adjusted. Thereafter the flange 13a of the bottomed cylindrical portion 13 is fitted into the lower terminal flange 14a of the cylindrical drum portion 14, and the fastening portion 16 is crimped and fixed, thus completing the assembling process.

In this way, only by crimping and fixing the partition plate member 27, the partition 7 is in a position to be pinched and pressed between the partition plate member 27 and the cutout step portion 30 of the vibration-isolating base 4, the orifice 24 having a predetermined length and cross-sectional area is sealed by the liquid, and the assembling work is facilitated. While being pressed and held in a sandwiching manner between the cylindrical portion 37 of the partition plate member 27 and the canopy portion 32 of the orifice member 26, the rubber-like elastic membrane 28 undergoes positioning to the cylindrical portion 37.

In the liquid-sealed anti-vibration device, the open terminal 34 of the sliding membrane portion 41 of the rubber-like elastic membrane 28 slides on the sliding face of the annular inner peripheral wall 31 thereby exhibiting a vibration damping function. At that time, since the open terminal 34 of the sliding membrane portion 41 assumes a thick-walled circular shape in cross-section, a contact area with the annular inner peripheral wall 31 of the orifice member 26 is ensured and the leakage of liquid between the main and the subsidiary liquid chambers 5a, 5b is dissolved, whereby the desired vibration-damping function can be maintained.

Here, under the normal oscillations, the generation of any abnormal sound (hitting sound) is decreased and free from interference with the stoppers with the prior art movable plate type. Moreover unlike the prior art elastic membrane type closing the opening of the partition, the open terminal 34 slides along the annular inner peripheral wall 31 and consequently, the vibration dependency is minimized and the function meeting the required characteristics is exhibited.

Even if a large load is imposed on the sliding membrane portion 41 owing to the hydraulic pressure difference, the ascent of it is suppressed by the restraint portion 35 of the canopy portion 32 as illustrated in FIG. 3A and reversely, the descent is suppressed by the forcing portion 38 as shown in FIG. 3B, so that it is possible to prevent the deformation of the sliding membrane portion 41. Further because of the reinforcing ribs 42 formed on the inner face of the sliding membrane portion 41, the dimensional change of the rubber-like elastic membrane 28 can be restrained.

As a consequence, for example, it is possible to make the orifice 4 function as an orifice for a countermeasure to fine, long shake vibrations (e.g. 10 to 15 Hz) and to make the rubber-like elastic membrane 28 function to attenuate idle vibrations (30 to 40 Hz).

Figure 4:
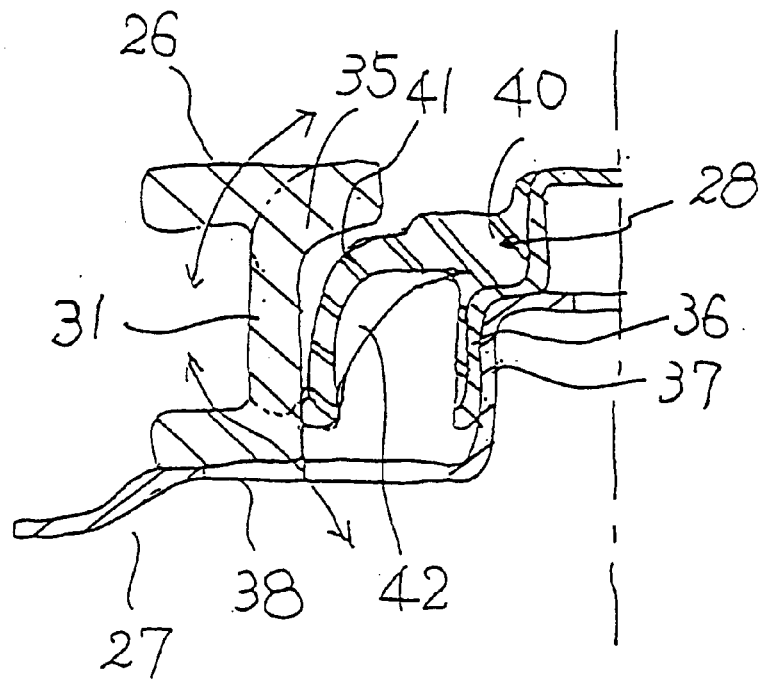
FIG. 4 is an enlarged sectional view of essential parts of the partition showing another embodiment of this invention.

In FIG. 4, another embodiment of the partition 7 is illustrated. Here, an alternative embodiment as a fixing attachment means of the base portion 40 of the rubber-like elastic membrane 28 is shown, wherein the reinforcement fitting 36 for the base portion 40 is press-fitted in the cylindrical portion 37 of the partition plate member 27, instead of the aforementioned embodiment, which is relied on clamping and holding by the canopy portion 32 of the orifice member 26 and the cylindrical portion 37 of the partition plate member 27.

According to this embodiment, the canopy portion 32 of the orifice member 26 for clamping the rubber-like elastic membrane 28 can be dispensed with. Instead, it will suffice to construct so that the annular inner peripheral wall 31 is provided with the restraint portion 35 projecting slightly inwardly to restrain the sliding membrane portion 41 from ascending. The constitution and function of this embodiment other than this particular partition structure are similar to the embodiment shown in FIGS. 1 to 3, and the explanation will be omitted, accordingly.

Figure 5:
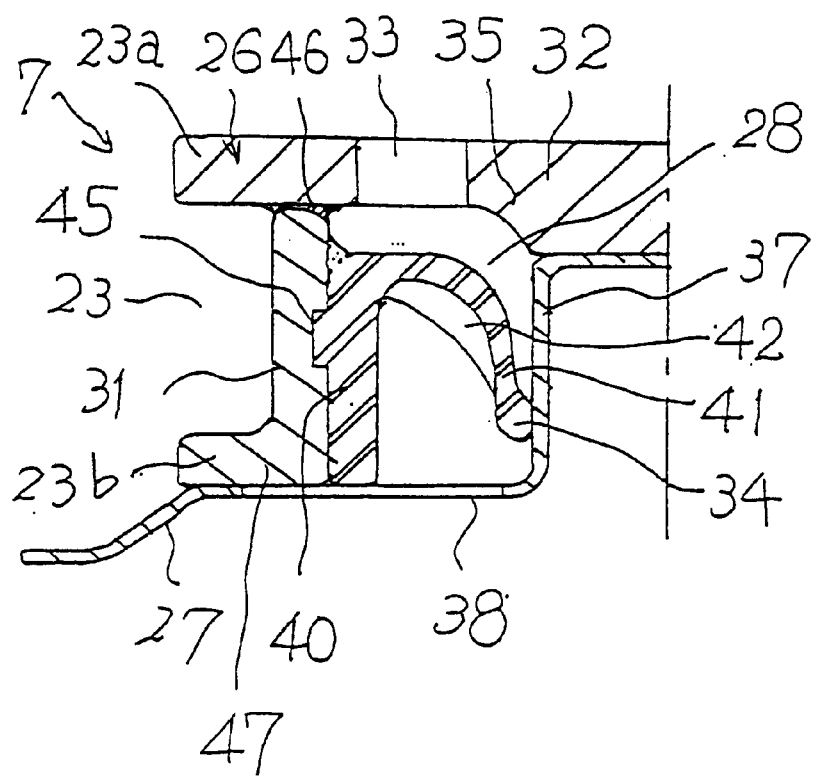
FIG. 5 is an enlarged sectional view of essential parts of the partition showing further embodiment of this invention.

FIG. 5 shows a further embodiment of the partition. Here, the rubber-like elastic membrane 28 is constructed as an annular structure so that the base portion 40 is disposed on the outer periphery side and the open terminal 34 is disposed on the inner side, the sliding face of the open terminal 34 being along the side face of the cylindrical portion 37 of the partition plate member 27.

In this embodiment, as the fixing attachment means of the base portion 40 of the rubber-like elastic membrane 28, it is bonded by vulcanization to the annular inner peripheral wall 31 of the orifice member 26 and besides, the latter (31) is formed on its inner peripheral face with a depression 45, in which to fill the rubber-like elastomer thereby preventing the separation of the base portion 40.

Further because the open terminal 34 is located inwardly, part of the canopy portion 32 of the orifice member 26 is projected downwardly and the projecting portion is formed with the restraint portion 35 in a radiused form for restraining the rise.

With this orifice member 26, since the base portion 40 of the rubber-like elastic membrane 28 is bonded by vulcanization to the annular inner peripheral wall 31 and the ascent-restraining portion 35 is formed to the canopy portion 32 in this manner, the annular inner peripheral wall 31 and the canopy portion 32 are formed as separate bodies. That is, both an annular member 47 including a lower end wall portion 23b at its outer periphery side and the annular inner peripheral wall 31 and the canopy portion 32 including an upper top wall 23a at its outer periphery side and the ascent-restraining portion 35 projecting downwardly are shaped separately in a mold, and then the annular member 47 is fixed by sandwiching between the canopy portion 32 and the forcing portion 38 of the partition plate member 27.

With a view to ensuring the sealing tightness between the annular inner peripheral wall 31 and the upper end wall 23a of the canopy portion 32, it is preferred to form a rubber membrane 46 on the annular inner peripheral wall 31 at its upper edge. The other construction and function of this embodiment except for this particular example are similar to the embodiment as indicated in FIGS. 1 to 3.

According to the aforementioned construction, the assembling of the partition 7 is conducted in a liquid in the procedure such that of the orifice member 25, first, the canopy portion 32 is press-fitted to reach the cutout step portion 30 of the vibration-isolating base 4, then the annular member 47 vulcanization-bonded to the rubber-like elastic membrane 28 is inserted, and subsequently, the partition plate member 27 is, from the upside, press-fitted or inserted along the fastening portion 16 to fix the annular member 47 between the canopy portion 32 and the partition plate member 27.

The embodiment of this liquid-sealed anti-vibration device is that the open terminal 34 of the rubber-like elastic membrane 28 slides along the cylindrical portion 37 of the partition plate member 27, but yet is of a cantilevered sliding membrane structure similar to the partition structure shown in FIGS. 1 to 3, and consequently, the desired vibration-damping characteristic is maintained and similar functions and effects to those of the partition structure in FIGS. 1 to 3 are achieved.

Where the rubber-like elastic membrane 28 is constructed as an annular structure so that the base portion 40 is disposed at its outer periphery side and the open terminal 34 is disposed at its inner side, it is also possible to adopt another embodiment of the rise-restraining portion 35 by taking advantage of the cylindrical portion 37 of the partition plate member 27, instead of forming it at the canopy portion 32 in the embodiment of FIG. 5.

As is clear from the description above, according to the invention, the rubber-like elastic membrane provided in the partition is of a cantilevered sliding membrane structure, so that the amplitude dependency can be decreased and the dynamic spring constant in a wide spectrum of the high and median frequencies can be lowered. Therefore when used for an engine mount for supporting an automotive engine, this liquid-sealed anti-vibration device furnishes an excellent engine mount such that the vibration dependency is small, the noise is lowered and a superior vibration-damping characteristic is obtainable.

What is claimed is:

1. A liquid-sealed anti-vibration device, comprising:
   a vibration-isolating base and a diaphragm forming a liquid chamber therebetween; and
   a partition dividing the liquid chamber into a main liquid chamber and a subsidiary liquid chamber, wherein:
   the partition includes an orifice member having an orifice channel at a peripheral lateral side, a partition plate member crimped and fixed beneath the orifice member to the anti-vibration device such that an outer peripheral part of an upper end of the orifice member contacts an outer peripheral end of the vibration-isolating base on a liquid chamber side thereof, and an elastic membrane disposed in a space formed between the orifice member and the partition plate member;

the elastic membrane has a base portion attached fixedly to one of the orifice member and the partition plate member and an open terminal at a distal end, the open terminal being slidably in pressure contact with another one of the orifice member and the partition plate member; and the elastic membrane has an inner face formed with reinforcing ribs circumferentially formed at a plurality of positions.

* * * * *